United States Patent [19]
Peters

[11] 4,405,936
[45] Sep. 20, 1983

[54] METHOD OF AND ARRANGEMENT FOR DIGITIZING A COLOR VIDEO SIGNAL

[75] Inventor: Joseph H. Peters, Eindhoven, Netherlands

[73] Assignee: U.S. Philips Corporation, New York, N.Y.

[21] Appl. No.: 288,231

[22] Filed: Jul. 27, 1981

[30] Foreign Application Priority Data

Aug. 8, 1980 [NL] Netherlands .................. 8004521

[51] Int. Cl.³ .............................................. H04N 9/32
[52] U.S. Cl. ..................................................... 358/13
[58] Field of Search .......................................... 358/13

[56] References Cited

U.S. PATENT DOCUMENTS 4,323,916  4/1982  Dischert et al. ...................... 358/13

Primary Examiner—Richard Murray
Attorney, Agent, or Firm—Edward W. Goodman

[57] ABSTRACT

In order to obtain a reduction of the bit rate when digitizing a color video signal using a picture transform, the color video signal is sampled with a frequency which is twice the color auxiliary carrier frequency. The video signal samples thus obtained are assembled into two-dimensional subpictures each comprising P consecutive video signal samples of each time Q consecutive line signals. Each subpicture can be considered as the sum of a series of superposed basic pictures, each having its own coefficient (which is a weighting factor representing the contribution of the basic picture in the subpicture). Each coefficient is encoded with a number of bits assigned thereto. The basic pictures are assembled from picture squares which are either of a first type (completely white) or a second type (completely black). The Hadamard matrix transform determines the basic picture patterns. Each of the two color information signals u(t) and v(t) in the color video signal now contributes to a subpicture in such a way that this contribution can be fully described by one basic picture. Only the coefficients associated with these basic pictures need be encoded accurately.

2 Claims, 38 Drawing Figures

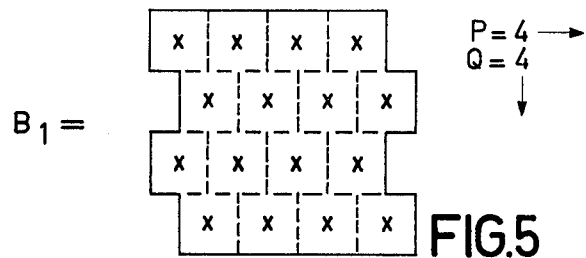
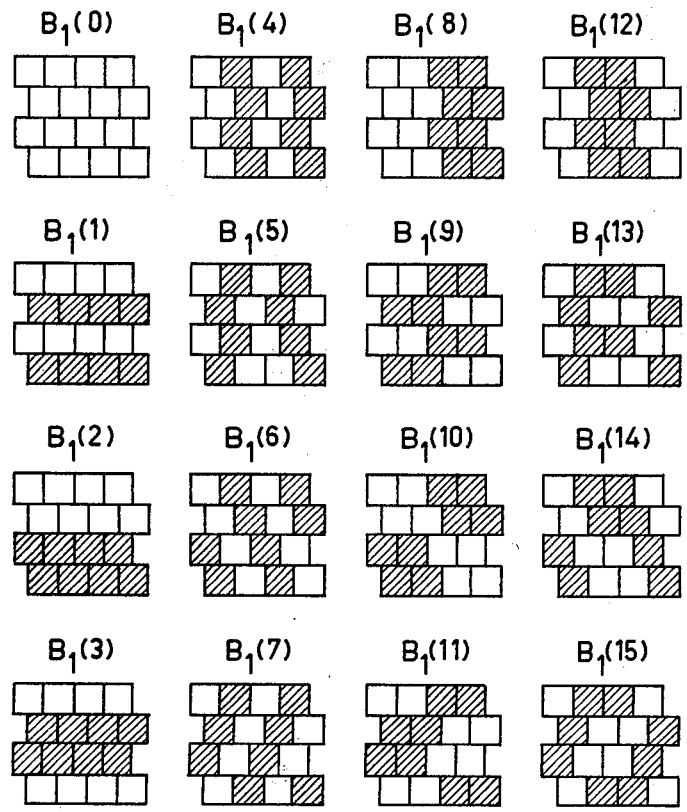
$$H_4 = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \quad \text{FIG.8}$$

 = +1  = −1
FIG.6a   FIG.6b
$u(t) = \begin{bmatrix} + & - & + & - \\ + & - & + & - \\ + & - & + & - \\ - & + & - & + \end{bmatrix} = $ = $B_1^{(6)}$
FIG.9a   FIG.9b
$v(t) = \begin{bmatrix} + & - & + & - \\ - & + & - & + \\ - & + & - & + \\ + & - & + & - \end{bmatrix} = $ = $B_1^{(7)}$
FIG.10a   FIG.10b $$u(t) = \begin{matrix} + & - & + & - \\ - & + & - & + \\ + & - & + & - \\ - & + & - & + \end{matrix} = \text{[checkerboard pattern]} = C_1(5)$$

FIG.16

$$v(t) = \begin{matrix} + & - & + & - \\ - & + & - & + \\ - & + & - & + \\ + & - & + & - \end{matrix} = \text{[checkerboard pattern]} = C_1(7)$$

| AD(0) | AD(1) |
|---|---|
| 1 | 1 |
| 2 | 2 |
| 3 | 3 |
| 4 | 4 |
| 5 | 557 |
| 6 | 558 |
| 7 | 559 |
| 8 | 560 |
| 9 | 1113 |
| 10 | 1114 |
| 11 | 1115 |
| 12 | 1116 |
| 13 | 1669 |
| 14 | 1670 |
| 15 | 1671 |
| 16 | 1672 |
| 17 | 5 |
| 18 | 6 |
| 19 | 7 |
| 20 | 8 |
| 21 | 561 |
| 22 | 562 |
| 23 | 563 |
| 24 | 564 |
| 25 | 1117 |
| 26 | 1118 |
| 27 | 1119 |
| 28 | 1120 |
| 29 | 1673 |
| 30 | 1674 |
| 31 | 1675 |
| 32 | 1676 |
| 33 | 9 |
| 34 | 10 |
| 35 | 11 |
| 36 | 12 |
| ⋮ | ⋮ |
| 2219 | 1667 |
| 2220 | 1668 |
| 2221 | 2221 |
| 2222 | 2222 |
| 2223 | 2223 |
| 2224 | 2224 |

FIG.33

$$H_{16} = \begin{pmatrix}
1 & 1 & 1 & 1 & 1 & 1 & 1 & 1 & 1 & 1 & 1 & 1 & 1 & 1 & 1 & 1 \\
1 & 1 & 1 & 1 & -1 & -1 & -1 & -1 & 1 & 1 & 1 & 1 & -1 & -1 & -1 & -1 \\
1 & 1 & 1 & 1 & 1 & 1 & 1 & 1 & -1 & -1 & -1 & -1 & -1 & -1 & -1 & -1 \\
1 & 1 & 1 & 1 & -1 & -1 & -1 & -1 & -1 & -1 & -1 & -1 & 1 & 1 & 1 & 1 \\
1 & -1 & 1 & -1 & 1 & -1 & 1 & -1 & 1 & -1 & 1 & -1 & 1 & -1 & 1 & -1 \\
1 & -1 & 1 & -1 & -1 & 1 & -1 & 1 & 1 & -1 & 1 & -1 & -1 & 1 & -1 & 1 \\
1 & -1 & 1 & -1 & 1 & -1 & 1 & -1 & -1 & 1 & -1 & 1 & -1 & 1 & -1 & 1 \\
1 & -1 & 1 & -1 & -1 & 1 & -1 & 1 & -1 & 1 & -1 & 1 & 1 & -1 & 1 & -1 \\
1 & 1 & -1 & -1 & 1 & 1 & -1 & -1 & 1 & 1 & -1 & -1 & 1 & 1 & -1 & -1 \\
1 & 1 & -1 & -1 & -1 & -1 & 1 & 1 & 1 & 1 & -1 & -1 & -1 & -1 & 1 & 1 \\
1 & 1 & -1 & -1 & 1 & 1 & -1 & -1 & -1 & -1 & 1 & 1 & -1 & -1 & 1 & 1 \\
1 & 1 & -1 & -1 & -1 & -1 & 1 & 1 & -1 & -1 & 1 & 1 & 1 & 1 & -1 & -1 \\
1 & -1 & -1 & 1 & 1 & -1 & -1 & 1 & 1 & -1 & -1 & 1 & 1 & -1 & -1 & 1 \\
1 & -1 & -1 & 1 & -1 & 1 & 1 & -1 & 1 & -1 & -1 & 1 & -1 & 1 & 1 & -1 \\
1 & -1 & -1 & 1 & 1 & -1 & -1 & 1 & -1 & 1 & 1 & -1 & -1 & 1 & 1 & -1 \\
1 & -1 & -1 & 1 & -1 & 1 & 1 & -1 & -1 & 1 & 1 & -1 & 1 & -1 & -1 & 1
\end{pmatrix}$$

FIG.34

| m  | {y(m)} |
|----|--------|
| 0  | 9 |
| 1  | 4 |
| 2  | 5 |
| 3  | 4 |
| 4  | 4 |
| 5  | 2 |
| 6  | 5 |
| 7  | 5 |
| 8  | 5 |
| 9  | 1 |
| 10 | 3 |
| 11 | 1 |
| 12 | 4 |
| 13 | 1 |
| 14 | 1 |
| 15 | 0 |

FIG.35

METHOD OF AND ARRANGEMENT FOR DIGITIZING A COLOR VIDEO SIGNAL

BACKGROUND OF THE INVENTION (1). Field of the invention.

The invention relates to a method of digitizing a color video signal using transform coding.

The invention also relates to an encoding arrangement for putting this method into effect.

(2). Description of the prior art.

Over the years a number of methods have been described for digitizing a PAL or an NTSC color video signal; namely:

(a) pulse code modulation, abbreviated to PCM;

(b) differential pulse code modulation, abbreviated to DPCM;

(c) transform coding, abbreviated to TC.

In PCM the video signal is sampled with a predetermined sampling frequency $f_s$ which is at least equal to the Nyquist sampling frequency. This results in video signal samples which are quantized and encoded. That is to say, each video signal sample is converted into a code word comprising a predetermined number of bits. This results in a digital color video signal which has in practice a bit rate of approximately 120 Megabits per second.

A considerably more advantageous bit rate is obtained by the use of DPCM, in which the aim is to reduce the redundancy in the color video signal. To this end, in one method of DPCM, this video signal is first sampled with the Nyquist sampling frequency and a prediction value is generated for each video signal sample thus obtained. Instead of the video signal sample itself, the difference between the video signal sample and its prediction value is now quantized and encoded (see, for example, References 1 and 2). DPCM can be realized with comparatively simple equipment and furnishes good results as long as no greater reduction of the bit rate is required than a reduction by a factor of three (see, for example, Reference 3).

A completely different manner of redundancy reduction is obtained by the use of TC (picture) transform coding; (see, for example, the References 2, 4 and 5). For TC, the TV picture is, as it were, divided into a large number of rectangular subpictures and each subpicture is thereafter assumed to be the sum of a number of mutually orthogonal basic pictures B(0), B(1), -, B(N-1), each having its own weighting factor y(0), y(1), -, y(N-1). Hereinafter these weighting factors will be denoted coefficients, as is customary, and it is these coefficients which are quantized and encoded.

In practice, to determine these coefficients, the video signal is first sampled at the Nyquist sampling frequency. The signal samples x(n) thus obtained may be used directly, or after analog-to-digital conversion, for further processing. The subpicture is now formed by N of these video signal samples, which all belong to either the same line signal or to different line signals. When each video signal sample x(n) of this subpicture is multiplied by a constant factor h(m,n) and the products obtained are added together, the coefficient y(m) is obtained. Mathematically, this operation can be expressed as follows:

$$y(m) = \sum_{n=0}^{N-1} h(m,n) x(n) \quad (1)$$

-continued $$m = 0, 1, 2, 3, \ldots N - 1$$

The constant factors h(m,n) may be assumed to be the elements of an $N \times N$-matrix H, which will be denoted a transformation matrix.

For black and white TV, where the video signal represents only one time-variable quantity, namely the brightness, the basic picture B(0) represents the average brightness of the subpicture and y(0) the amplitude value thereof. This coefficient is consequently the most important coefficient and must therefore be encoded with high accuracy. The remaining basic pictures B(1), -, B(N-1) furnish information about the detail in the subpicture. It appears that the coefficients y(1), -y(N-1) associated with these basic pictures may usually be encoded with considerably less accuracy. In practice the coefficient y(0) is generally converted into a code word z(0) having eight or nine bits, while each of the remaining coefficients y(m) is converted into a code word z(m) which comprises only 0, 1, 2, 3, 4 or 5 bits. As almost all the code words z(m) obtained in this way have a word length which is less than the word length of the PCM coded video signal samples x(n), the bit rate is also lower. By a suitable choice of the transformation matrix H, it is even possible to reduce this bit rate to a value below the bit rate obtained by DPCM coding of the video signal samples. The transformation matrices which are most frequently used in this connection are the Hotelling, the Fourier, the Hadamard and the Haar matrices.

Although in black and white TV a further reduction of the bit rate with respect to the DPCM can be obtained by the use of transform coding, the use of transform coding in the case of color TV results in hardly any reduction in bit rate, even compared to PCM. For color TV, DPCM coding of the video signal samples should be preferred. Reference 6 proves that in that case an additional reduction of the bit rate can be realized. In this Reference 6, it is proven that the PAL color video signal can be sampled with a sampling frequency $f_s$ which is twice as high as the color subcarrier frequency $f_{sc}$, provided the sampling instants coincide only with the 45° and 225° phase positions of the color information signal u(t). Reference 7 describes that also the NTSC color video signal may be sampled with a sampling frequency which is twice as high as the color subcarrier frequency $f_{sc}$, provided the sampling instants alternately coincide first during two line signals with the 45° and 225° phase positions and during two subsequent line signals with the 135° and 315° phase positions of the color information signal u(t).

SUMMARY OF THE INVENTION

The invention has for its object to provide a method of digitizing a PAL or an NTSC color video signal with which an attractive reduction of the bit rate is realized relative to DPCM.

According to the invention there is provided a method of digitizing a color video signal which is formed by a sequence of line signals each comprising a superposition of a brightness signal and two color information signals u(t) and v(t) which are each formed by a color difference signal modulated on a subcarrier with a color subcarrier frequency $f_{sc}$, the method comprising the following steps:

(a) sampling the color video signal with a sampling frequency $f_s$ which is equal to twice the color subcarrier frequency $f_{sc}$ and at instants which coincide with the phase points $\pm\pi/4+M\pi$ of the color information signal u(t) in the line signal, M representing an integer, to generate video signal samples x(n);

(b) forming a subpicture comprising Q video groups which are each formed by a sequence of P video signal samples of the relevant line signal and are associated with Q consecutive line signals;

(c) converting such a subpicture into a group of coefficients consisting of N coefficients y(m) which are each equal to the sum of versions of the subpicture video signal samples which have been weighted with a factor +1 or −1, wherein m=0, 1, 2, −N−1 and wherein N is equal to the product of P and Q; and (d) converting each of the coefficients y(m) into a code word z(m) which comprises a number of bits assigned to the relevant coefficient.

Step (a) defines the sampling mode of a color video signal as proposed in Reference 6 for a PAL signal and in Reference 7 for a NTSC signal. This step (a) in combination with step (b) produces a subpicture the picture elements of which (video signal samples) have been shifted relative to each other from line to line. Step (c) indicates that for the transformation of the subpicture, the Hadamard matrix must be selected as the transformation matrix. The actual coding step (d) results in the desired reduction of the bit rate.

The invention is based on the recognition of the following fact. As mentioned in the foregoing, the mean brightness in black and white TV is represented by the basic picture B(0) and the amplitude value of this mean brightness by y(0). This means that when a subpicture is of a uniform grey color, only this coefficient y(0) differs from zero and only this coefficient need be coded. This is independent of the sampling frequency which is now assumed to be equal to the Nyquist sampling frequency.

Let now a color video signal, which has been sampled at the Nyquist sampling frequency and which in addition to a constant brightness signal comprises only one color information signal of a constant amplitude, be considered. As in black and white TV, the brightness of a subpicture may also be represented by the single basic picture B(0). Although the color information signal has a constant amplitude the contribution of this signal to a subpicture can only be represented by the sum of a fairly large number of basic pictures. The coefficients associated with the last-mentioned basic pictures must all be encoded accurately. This is the reason why transform coding applied to a color video signal which has been sampled at the Nyquist sampling frequency, results in hardly any reduction in bit rate irrespective of the type of transformation matrix used. The same appears to be the case when the color video signal is sampled with a frequency which is twice as high as the color subcarrier frequency $f_{sc}$ and a transformation matrix is used which is not identical to the Hadamard matrix.

Using the invention it is achieved, for example, that in the presence of a color information signal of a constant amplitude, the contribution thereof to a subpicture can be adequately described by a single basic picture, so that only the coefficient associated therewith needs to be coded accurately. This achieves the intended reduction of the bit rate; this reduction amounts to, for example, a factor of 5.

TERMINOLOGY

1. A color video signal is formed by a sequence of line signals each including the superposition of a luminance signal Y and two color information signals u(t) and v(t), wherein:

$$u(t) = U \sin(2\pi f_{sc}t + \psi) \quad (2)$$

$$v(t) = \gamma V \cos(2\pi f_{sc}t + \psi) \quad (3)$$

Herein U is proportional to B−Y and V to R−Y. The quantity B represents the blue primary color signal and R represents the red primary color signal. For NTSC $\gamma=1$, and for PAL $\gamma$ is alternately +1 and −1 for consecutive line signals. The quantity $f_{sc}$ is designated the color subcarrier frequency. When the color video signal is now denoted by E, then this may be mathematically written as:

$$E = Y + U \sin(2\pi f_{sc}t + \psi) + \gamma V \cos(2\pi f_{sc}t + \psi) \quad (4)$$

2. The Nyquist sampling frequency is a frequency which is twice as high as the highest frequency $f_m$ in the color video signal. This frequency $f_m$ is higher than $f_{sc}$.

REFERENCES

1. Differential Encoding of Composite Color Television Signals Using Chrominance—Corrected Prediction; J. E. Thompson; IEEE Transactions on Communications, Vol. COM-22, No. 8, August 1974, pages 1106–1113.

2. Picture Coding; A Review; A. N. Netravali, J. O. Limb, Proceedings of the IEEE, Vol. 68, No. 3, March 1980, pages 366–406.

3. Digital Differential Quantizer for Television; J. O. Limb, F. W. Mounts; Bell System Technical Journal, Vol. 48, 1969, pages 2583–2599.

4. Transform Picture Coding; P. A. Wintz; Proceedings of the IEEE, Vol. 60, No. 7, July 1972, pages 809, 820.

5. Real-time orthogonal transformation of colour-television pictures; H. Bacchi, A. Moreau; Philips Technical Review, Vol. 38, No. 4/5, 1978/1979, pages 119–130.

6. Digital-Video; Sub-Nyquist Sampling of PAL Colour Signals; V. G. Devereux; BBC Research Department, Report No. BBC RD 1975/4; January 1975.

7. Sub-Nyquist Sampled PCM NTSC Colour TV Signal Derived from Four Times the Color Subcarrier Samples Signal; J. P. Rossi, IBM 78, Conference Publication No. 166, pages 218–221.

SHORT DESCRIPTION OF THE FIGURES

In order that the invention may be more fully understood, reference will now be made by way of example to the accompanying drawings, of which:

FIGS. 2–10 show sampling instants, subpictures and color information signals u(t) and v(t), to explain the operation of the coding arrangement of FIG. 1 for the case of PAL and subpictures of mutually the same shape.

FIGS. 11–17 show sampling instants, subpictures and color information signals u(t) and v(t) to explain the coding arrangement of FIG. 1 for the case of NTSC and subpictures of mutually the same shape.

FIG. 33 shows the relationship between the address codes AD(0) and AD(1) used in the subpicture-forming circuit of FIG. 32.

FIG. 34 shows the 16×16 Hadamard matrix.

FIG. 35 shows, in the form of a Table, the number of bits assigned to the different coefficients y(m).

THE CODING ARRANGEMENT (1). General structure

Figure 1:
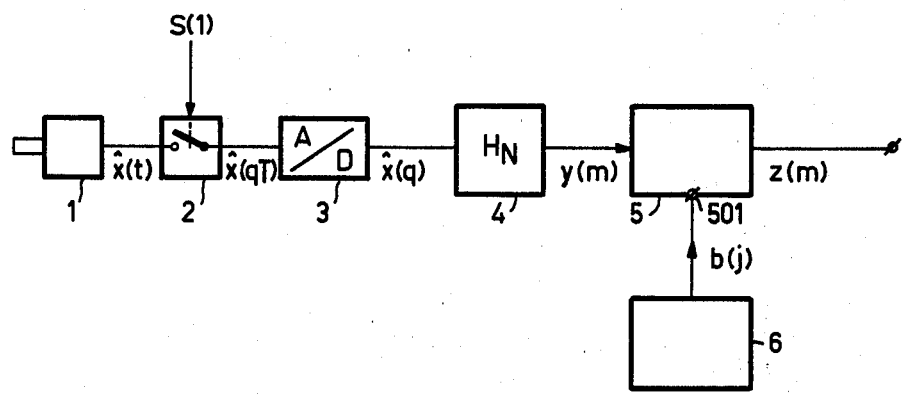
FIG. 1 shows the general structure of a coding arrangement in which transform coding is used.

FIG. 1 shows a coding arrangement the structure of which is based on the method of the invention. A color video signal $\hat{x}(t)$, coming from a video signal source 1, is applied to this coding arrangement. This video signal is applied to a sampling device 2 which takes samples of this video signal and produces the video signal samples $\hat{x}(qT)$ under the control of sampling pulses S(1) occurring at a sampling frequency $f_s = 1/T$. Herein it holds that $q = -, -2, -1, 0, 1, 2, -$ These video signal samples are applied to an analog-to-digital converter 3, which produces the digital video samples $\hat{x}(q)$. These digital video samples $\hat{x}(q)$ are applied to a transform arrangement 4, which will be further described hereafter and which:

1. arranges the digital video samples into a subpicture consisting of Q video groups associated with consecutive line signals, each video group being formed by a sequence of P video signal samples of the relevant line signal;

2. transforms a subpicture thus formed into a coefficient group consisting of N coefficients y(m) which are each equal to the sum of the video signal sample versions of the subpicture, these versions having been weighted with a factor +1 or −1, wherein m=0, 1, 2, −N-1 and wherein N is equal to the product of P and Q.

If now a video signal sample of the subpicture is denoted x(n), then the relationship between a coefficient y(m) and the N video signal samples of the subpicture is defined by expression (1), for which it then holds more in particular that h(m,n)= +1 or −1.

As mentioned above, the factors h(m,n) may be considered as the elements of a transformation matrix H which, in this case, is identical to the Hadamard matrix. Hereinafter this will be expressed by stating that the Hadamard matrix is associated with the transformation arrangement.

The transformation arrangement consequently produces the coefficients y(m), which are applied to a variable word length auxiliary coding arrangement 5, which converts each coefficient into a code word z(m) having a suitable word length. This word length is determined by a quantity b(j), which is produced by a bit-assignment memory 6 and is applied to this auxiliary coding arrangement 5 through a control input 501.

(2). Operation when using PAL color video signals.

As mentioned above, the sampling frequency $f_s$ is equal to twice the color subcarrier frequency $f_{sc}$. This frequency $f_{sc}$ is in a very special relationship with the line frequency $f_1$. Namely, it holds for PAL that:

$$f_{cs} = (i - \tfrac{1}{4})f_1 \tag{5}$$

wherein i is an integer.
From this it then follows:

$$f_s = (2i - \tfrac{1}{2})f_1 = \frac{1}{T} \tag{6}$$

Figure 2:
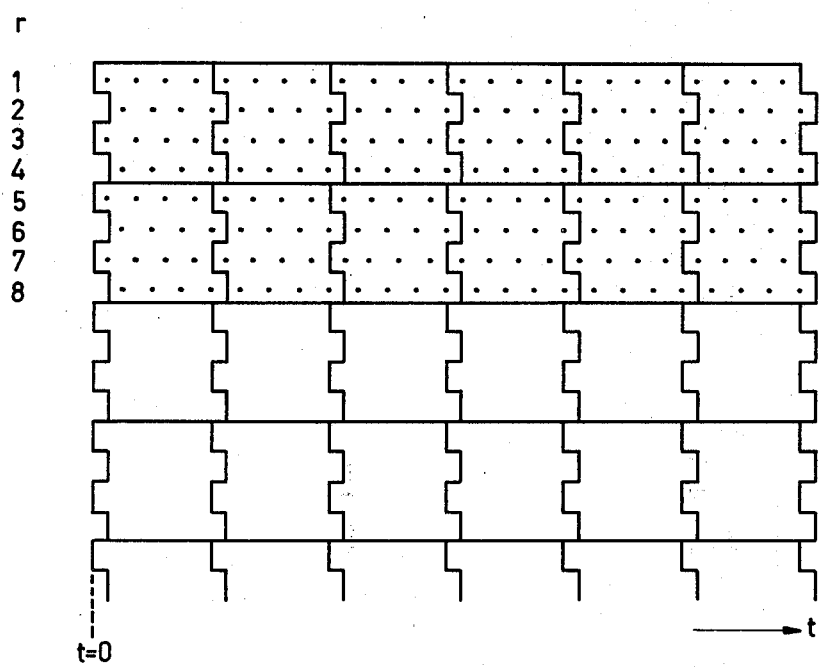

This relationship between $f_s$ and $f_1$ has very special consequences. Let it, for example, be assumed that the line signal having number starts at the instant $t_{o,r}$. Let it further be assumed that the $j^{th}$ video signal sample of this line signal is produced at the instant $t_{o,r}+\Delta t+(j-1)T$. Let it now be assumed that the line signal having number r+1 starts in a corresponding manner at the instant $t_{o,r+1}$. Then the $j^{th}$ video signal sample of this line signal occurs at the instant $t_{o,r+1}+\alpha t+(j-1)T\pm\tfrac{1}{2}T$. FIG. 2 schematically shows, by way of illustration, by means of dots, the instants at which the video signal samples of the line signals, having the numbers r=1, 2, 3, -8, are taken. However, in this Figure, the line signals are not shown consecutively, but below each other and in such a way that each line signal starts at instant t=0, shown in the Figure. In essence, the Figure represents therefore a TV picture.

In Reference 6 it is proved that $\Delta t$ must be chosen in such manner that at the sampling instants t, the argument or phase point $2\pi f_{sc}t+\psi$ of each of the goniometrical functions in the foregoing expressions (2), (3) and (4) is equal to $\pi/4+M\pi$, wherein M represents an integer.

Figure 3:
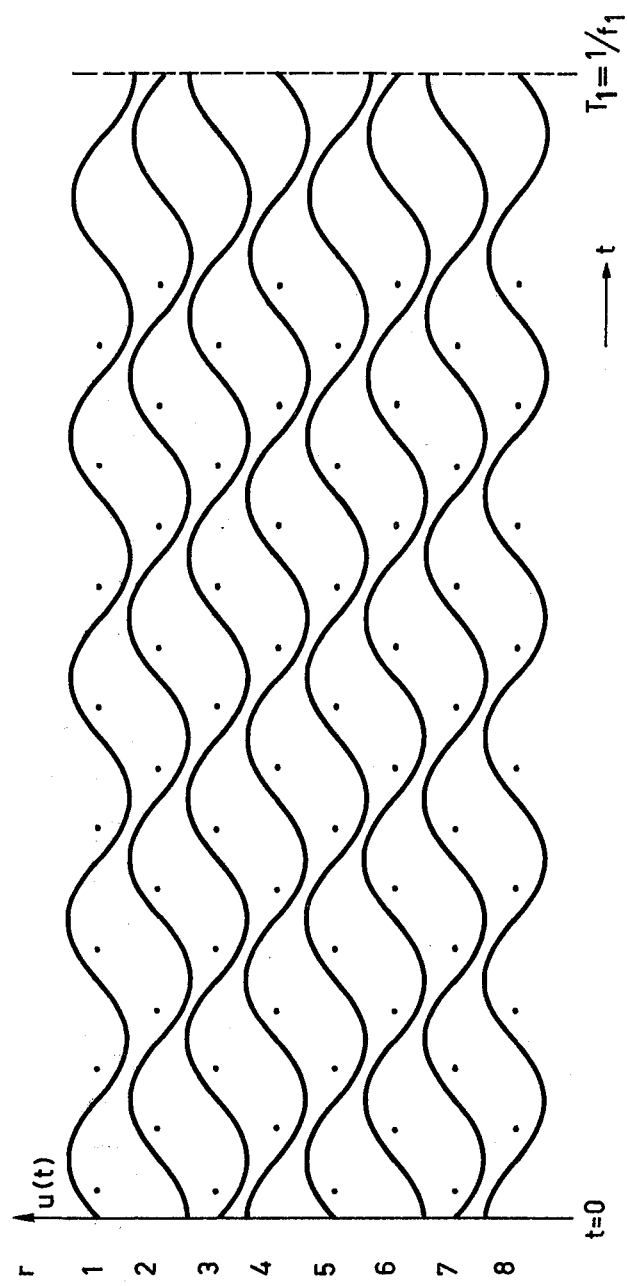
Figure 4:
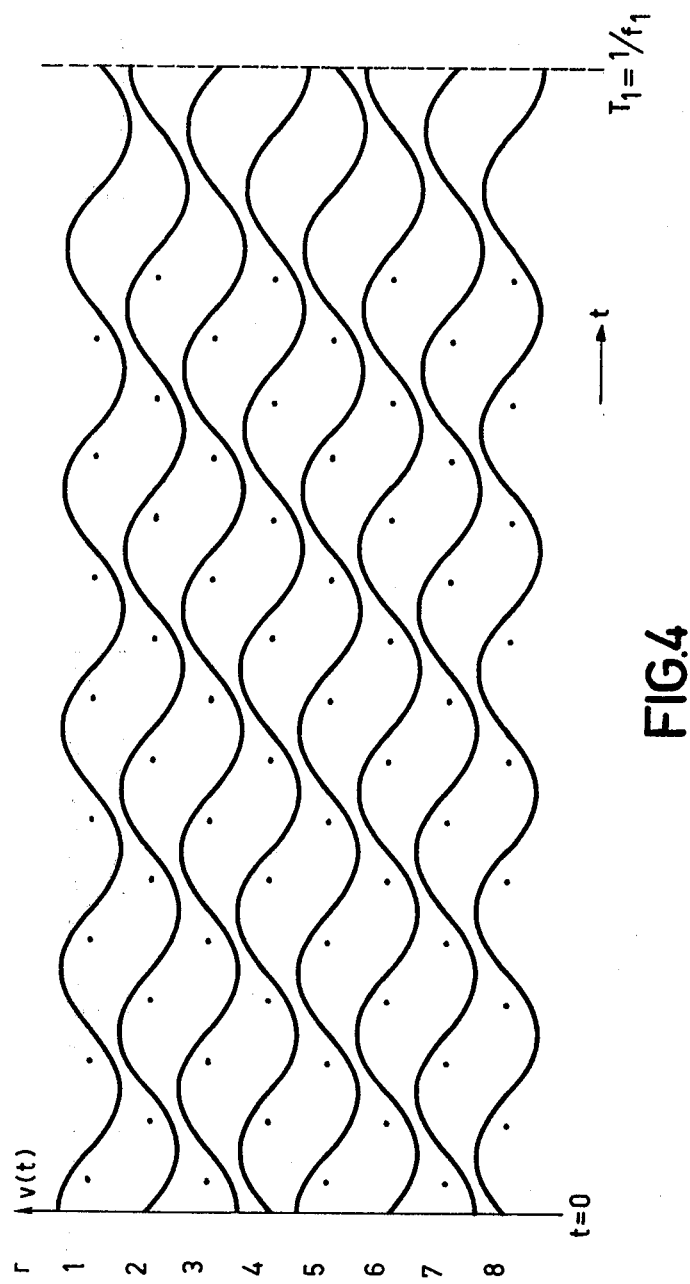

By way of illustration, the instants at which the video signal samples of the line signals having number r=1, 2, 3, -8 are taken, are shown again, on a smaller scale than in FIG. 2, by means of dots in each of the FIGS. 3 and 4. In these Figures the starting moment $t_{o,r}$ of each of the line signals is again fixed at the instant t=0 and $\psi$ is chosen equal to 0, so that $\Delta t=T/4$. In addition, FIG. 3 shows, for each line signal, the color information signal u(t). The amplitude U is assumed to be constant. In a corresponding manner, FIG. 4 shows, for each line signal, the color information signal v(t), it being assumed that the amplitude V is constant. For both Figures it is further assumed that i=5 (see expression 5). From FIG. 3 it is seen that at each sampling instant, the color information signal u(t) has the same absolute value. More particularly, this absolute value is equal to ½U√2. From FIG. 4 it is seen that at each sampling instant, the color information signal v(t) also has the same absolute value, which is now equal to ½V√2.

The digital video signal samples produced by the analog-to-digital converter 3 are arranged into subpictures in the transform arrangement 4. Hereinafter it will be assumed that this subpicture has the shape shown in FIG. 5 and that P=Q=4. Thus, this subpicture, which will be denoted by $B_1$, comprises the sixteen video signal samples indicated in FIG. 5 by the character "x". Now, each full TV picture may be assumed, as shown schematically in FIG. 2, to be assembled from a plurality of such subpictures. As shown in FIG. 5 by means of broken lines, each subpicture may be assumed as having been implemented from a plurality of squares of equal size, each comprising one video signal sample. Such a square is sometimes called a picture element or Pel (=Picture element). It is then assumed that the color video signal E (see expression (4)) is the same for each point of such a picture element.

When a Pel having a standardized signal value $+1$ is represented by the blank square shown in FIG. 6a and by representing a Pel having a standardised signal value $-1$ by means of the hatched square shown in FIG. 6b, the sixteen mutually orthogonal basic pictures $B_1(0)$, $B_1(1)$, -, $B_1(15)$, shown in FIG. 7, can be assembled. These basic pictures can be derived in the manner described in Reference 5 from the 4×4 Hadamard matrix $H_4$ shown in FIG. 8 and consist of completely "white" and completely "black" Pels.

As mentioned above, an orthogonal picture transform is based on the idea that each of the subpictures shown in FIG. 2 can be described as a linear combination of the sixteen basic pictures shown in FIG. 7, each basic picture $B_1(m)$ being multiplied by a predetermined coefficient $y(m)$.

Because of the special manner in which the color video signal is sampled and by choosing "bidimensional" subpictures, each row comprising the same number of video signal samples, it is seen from FIG. 3 that the contribution of the color information signal u(t) to each of the subpictures is the same and that this contribution may be represented by the auxiliary picture shown in FIG. 9a. Herein the sign "+" indicates that the color information signal u(t) is positive at the relevant sampling instant: more particularly it is then obtained that u(t)=½U√2. The sign "—" then indicates that u(t) is negative at the relevant sampling instant; more particularly, it is then obtained that u(t)=−½U√2. As now the absolute value of u(t) is the same at all sampling moments, this auxiliary picture of FIG. 9a can be standardised and be represented by the auxiliary picture assembled from sixteen Pels and shown in FIG. 9b. Since the Hadamard matrix, which also consists of elements having mutually identical absolute values, has been chosen as the transformation matrix, FIG. 9b and FIG. 7 can be compared with each other. From this comparison, it is seen that the contribution of u(t) to a subpicture is fully described by the contribution of one single basic picture to this subpicture. For the numeration of the basic pictures as used in FIG. 7, this is therefore $B_1(6)$.

From FIG. 4 it is seen, in a corresponding manner, that the contribution of the color information signal v(t) to each subpicture is the same and that this contribution may be represented by the auxiliary picture shown in FIG. 10a, which auxiliary picture can be converted into the auxiliary picture shown in FIG. 10b. If now FIG. 10b is compared with FIG. 7, then it is seen that the contribution of v(t) to a subpicture is also fully described by the contribution of one single basic picture to this subpicture, in this case by $B_1(7)$.

As mentioned in the foregoing, the contribution of the luminance signal Y to a subpicture is predominantly described by the contribution of the basic picture $B_1(0)$ to this subpicture and, consequently, by the coefficient y(0).

The desired reduction of the bit rate is now obtained by the fact that only the three coefficients y(0), y(6) and y(7) must be encoded accurately.

(3). Mode of operation with NTSC color video signals

As mentioned in the foregoing, also in this case the sampling frequency $f_s$ is equal to twice the color subcarrier frequency $f_{sc}$. However, this frequency is now in a different relationship to the line frequency $f_1$ than with PAL. More particularly, it holds for the NTSC system that:

$$f_{sc}=(i-\tfrac{1}{2})f_1; f_s=(2i-1)f_1 \qquad (7)$$

wherein i represents an integer.

This relationship between $f_s$ and $f_1$ has for its result that when the line signal having number r starts at the instant $t_{0,r}$, then for all values of r it holds that its $j^{th}$ video signal sample occurs at the instant $t_{0,r}+\Delta t+(j-1)T$.

Figure 11:
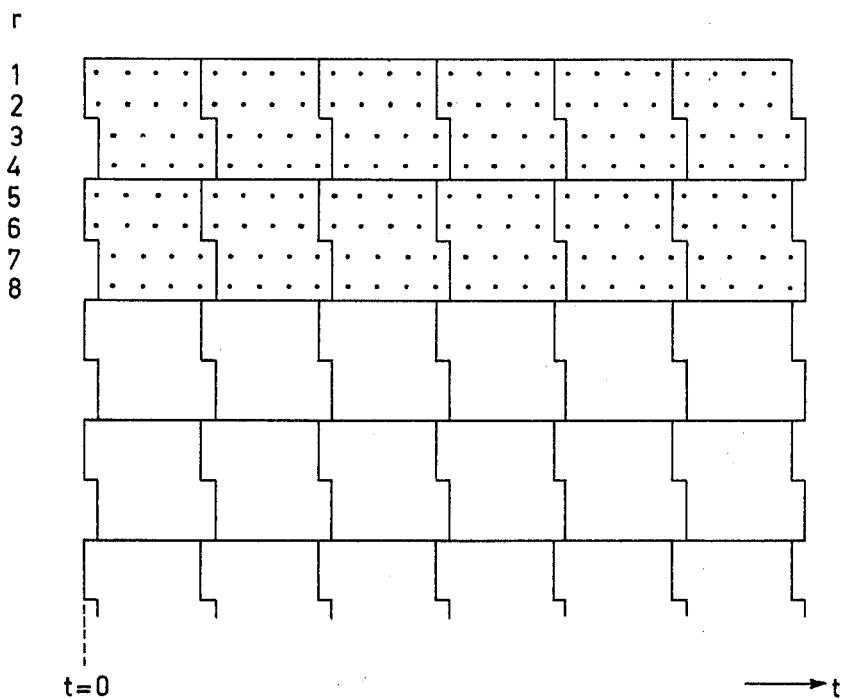

In Reference 7 it has been proven that $\Delta t$ must be chosen so that alternately for two line signals $\Delta t$ is first equal to $\Delta t_1$ and for two subsequent line signals $\Delta t=\Delta t_1 \pm T/2$. In FIG. 11, the instants at which the video signal samples of the line signals, having numbers r=1, 2, 3, -8, are taken are illustrated schematically, by way of illustration, by means of dots. In this Figure, as in FIG. 2, the line signals are shown in a subjacent relationship and in such manner that the starting instant of each line signal coincides with the instant t=0, shown in the Figure, so that this FIG. 11 also represents, as it were, a TV picture.

Figure 12:
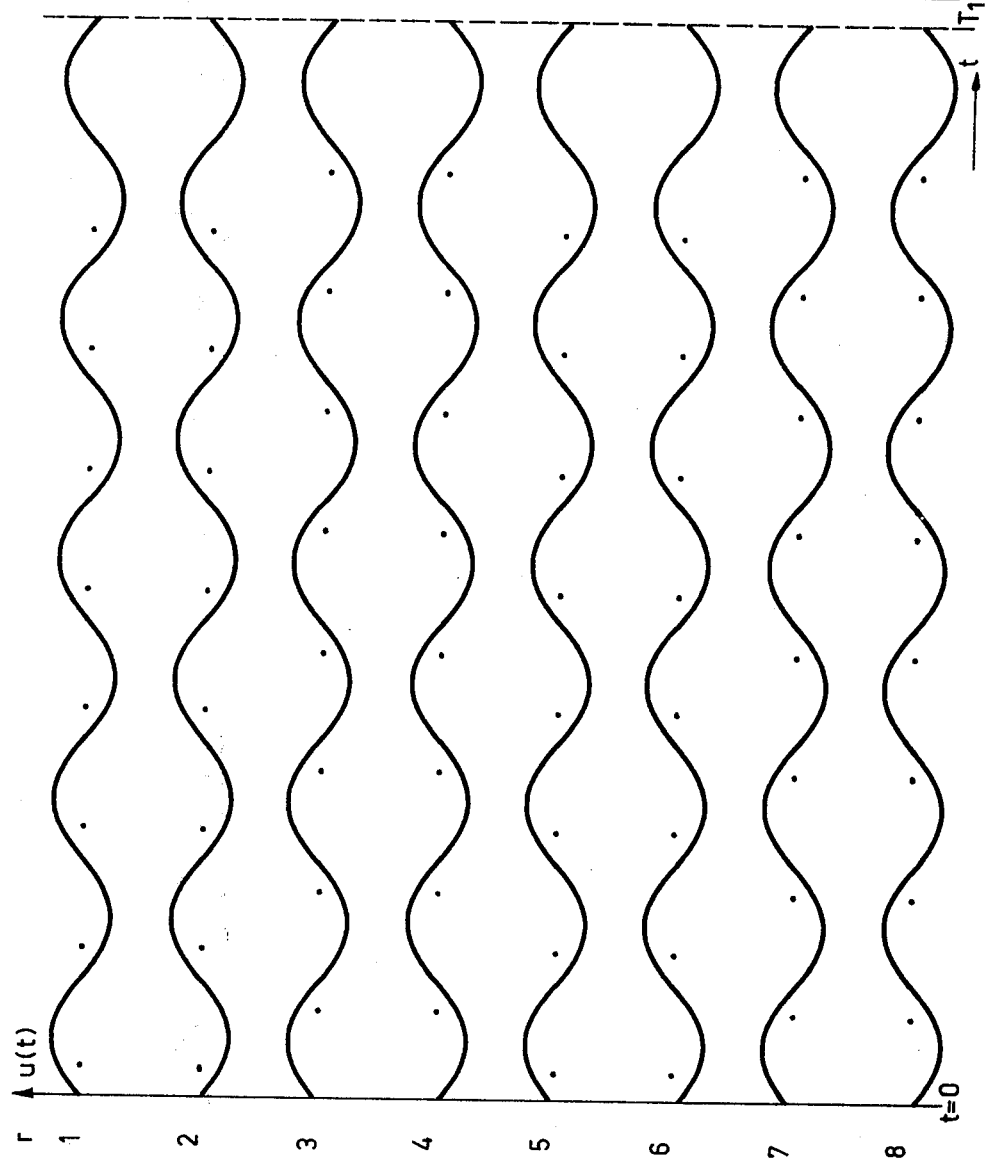
Figure 13:
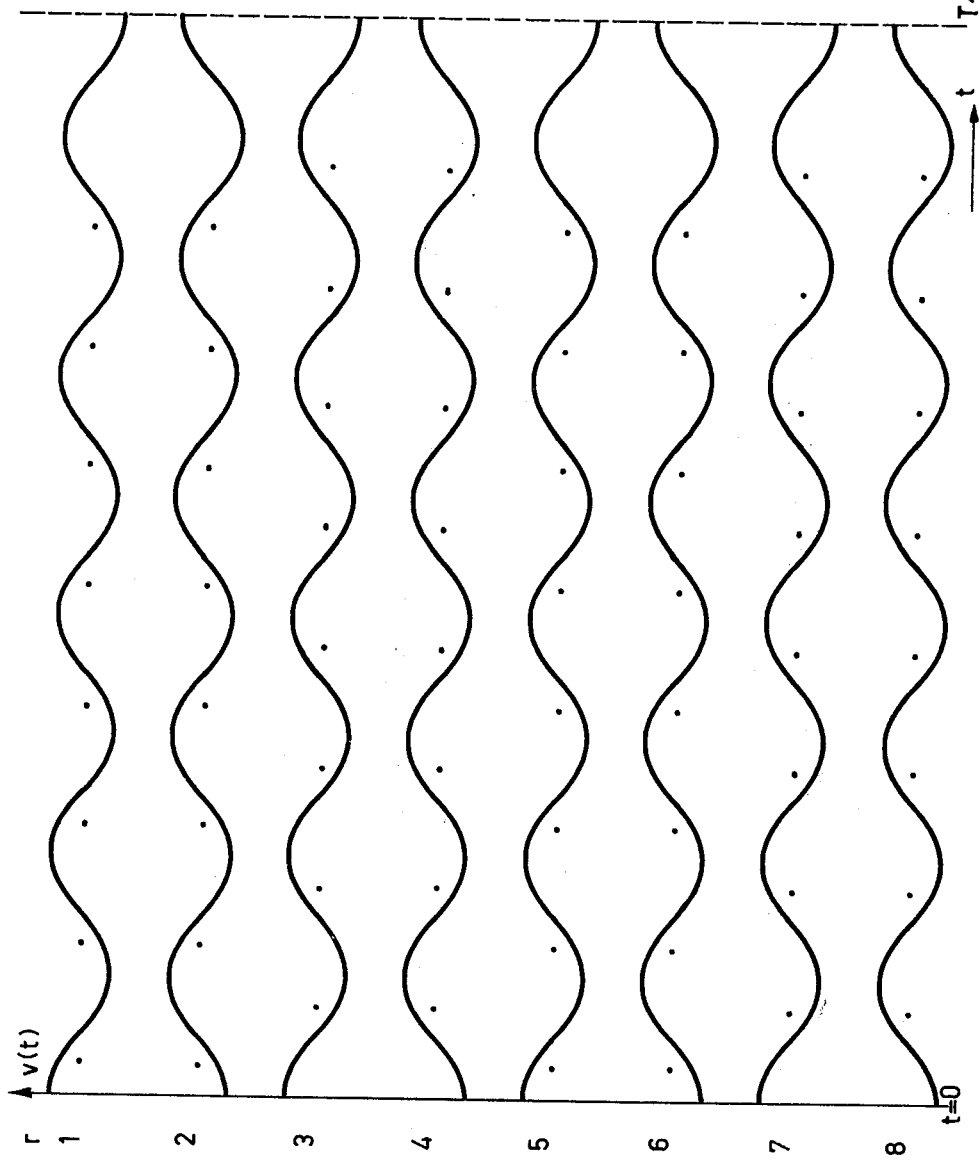

Reference 7 further proves that $\Delta t_1$ must be chosen so that $2\pi f_{sc}\Delta t_1=\pi/4$, so that at the sampling instants t, the argument or the phase point $2\pi f_{sc} t+\psi$ of each of the goniometrical functions in the expressions (2), (3) and (4) are alternately for two line signals first equal to $+\pi/4+M\pi$, wherein M=0, 1, 2, -and for two subsequent line signals $3/4\pi+M\pi=-\pi/4+(M+1)\pi$. A number of sampling instants for the line signals having number r=1, 2, 3, -8 is indicated by means of dots in each of the FIGS. 12 and 13. In these Figures, the starting instant of each of the line signals again coincides with t=0 and has been chosen equal to 0, so that $t_1=T/4$. In addition, the color information signal u(t) is shown in FIG. 12 for each line signal and the signal v(t) is shown in FIG. 13. As in the foregoing, let it also here be assumed that U and V are constant and that furthermore i=5. Also now it is seen, from FIG. 12 and expression (2), that u(t) has the same absolute value at each sampling instant. From FIG. 13 and expression (3), it is seen that this also holds for v(t).

Figure 14:
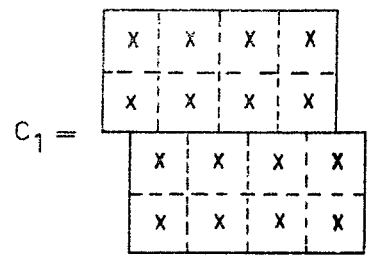
Figure 15:
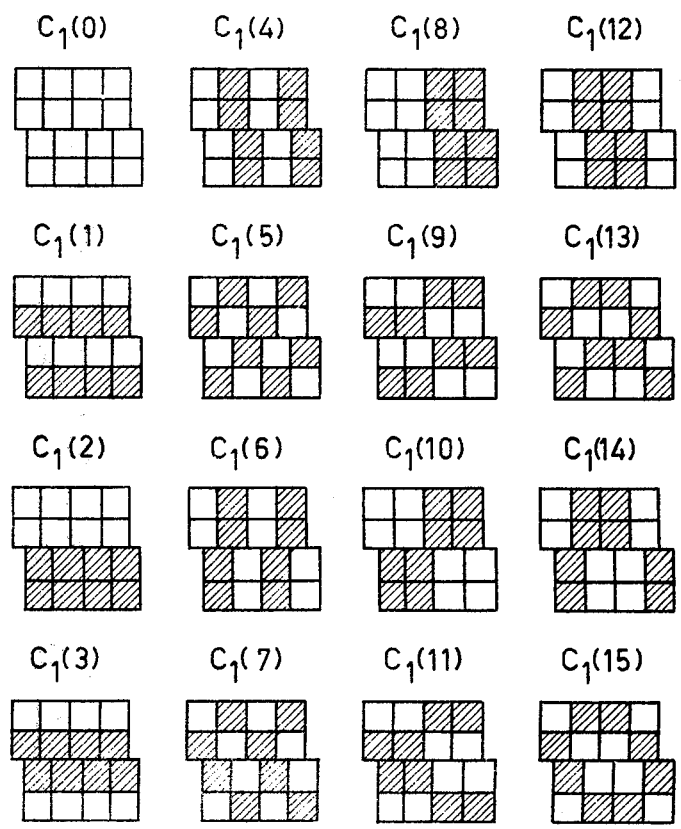

Owing to the special position of the sampling instants, the subpictures will now be chosen so that they have the shape of the subpicture shown in FIG. 14 for P=Q=4, which subpicture will be denoted by $C_1$. Analogous to what has been said in paragraph F(2), the sixteen mutually orthogonal basic pictures, $C_1(0)$, $C_1(1)$, -, $C_1(15)$, shown in FIG. 15, can now be assembled, it being possible to derive these basic pictures from the 4×4 Hadamard matrix $H_4$ shown in FIG. 8. Also here these basic pictures consist of completely "white" and completely "black" Pels. From FIGS. 12 and 13, respectively, it is seen that the contribution of $u(t)$ and $v(t)$, respectively, to each of the subpictures may be represented by the subpicture shown in FIGS. 16 and 17, respectively. When comparing FIG. 16 and FIG. 17, respectively, with FIG. 15, it is seen that the contribution of $u(t)$ and $v(t)$, respectively, to a subpicture is fully described by the contribution of the basic pictures $C_1(5)$ and $C_1(7)$, respectively, to this subpicture and consequently by the coefficients $y(5)$ and $y(7)$.

The desired reduction of the bit rate is now also obtained, as again only the coefficients $y(0)$, $y(5)$ and $y(7)$ must be encoded accurately.

(4). Mutually different subpictures

FIGS. 2 and 11 show how a TV picture can be divided into subpictures. In these Figures these subpictures all have the same shape, as a result of which the color information signal $u(t)$ is fully described for PAL by the basic picture $B_1(6)$ and $v(t)$ by $B_1(7)$, so that only the coefficients $y(0)$, $y(6)$ and $y(7)$ must be encoded accurately. For NTSC, the color information signal $u(t)$ is fully described by the basic picture $C_1(5)$ and $v(t)$ by $C_1(7)$, so that only the coefficients $y(0)$, $y(5)$ and $y(7)$ must be encoded accurately. In practice it appears advantageous to use several subpictures of mutually different shapes and to define with each subpicture shape a system of mutually orthogonally basic pictures which are derived from a Hadamard matrix. This will be further explained hereinafter for the case where $P=Q=4$.

Figure 18:
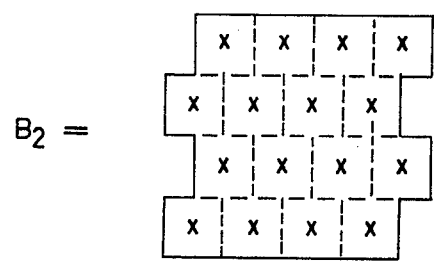
FIGS. 18–22 show sampling instants and subpictures to explain the operation of the coding arrangement of FIG. 1 for the case of PAL and subpictures of a mutually different shape.
Figure 19:
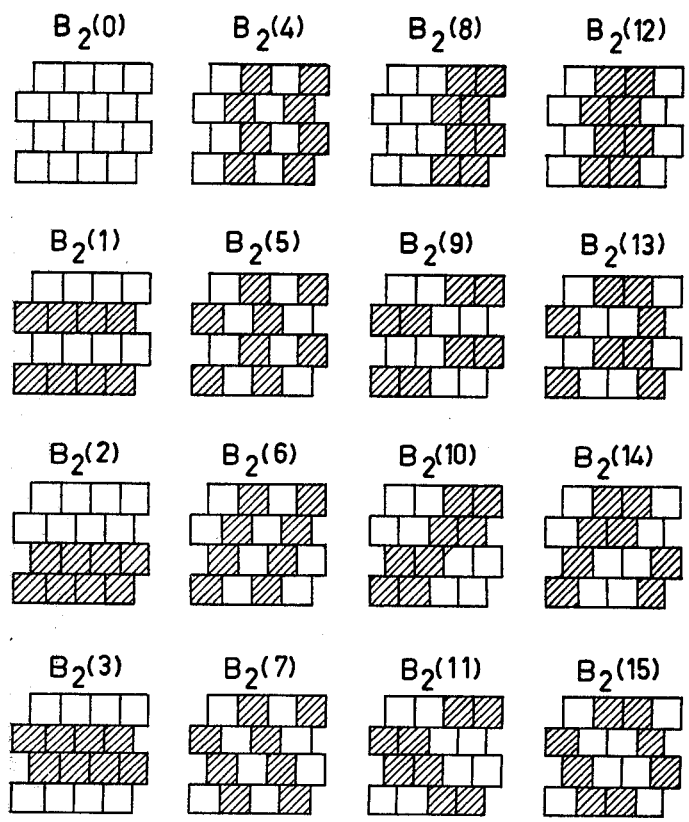

With PAL, the subpicture $B_2$, shown in FIG. 18, may be substituted for the subpicture $B_1$ of FIG. 5. The system of sixteen orthogonal basic pictures shown in FIG. 19 is associated with this subpicture $B_2$. A basic picture $B_2(i)$ is derived from the basic picture $B_1(i)$. To this end, the rows of $B_1(i)$ are shifted in such manner relative to one another that this basic picture assumes the shape of the subpicture $B_2$.

Figure 21:
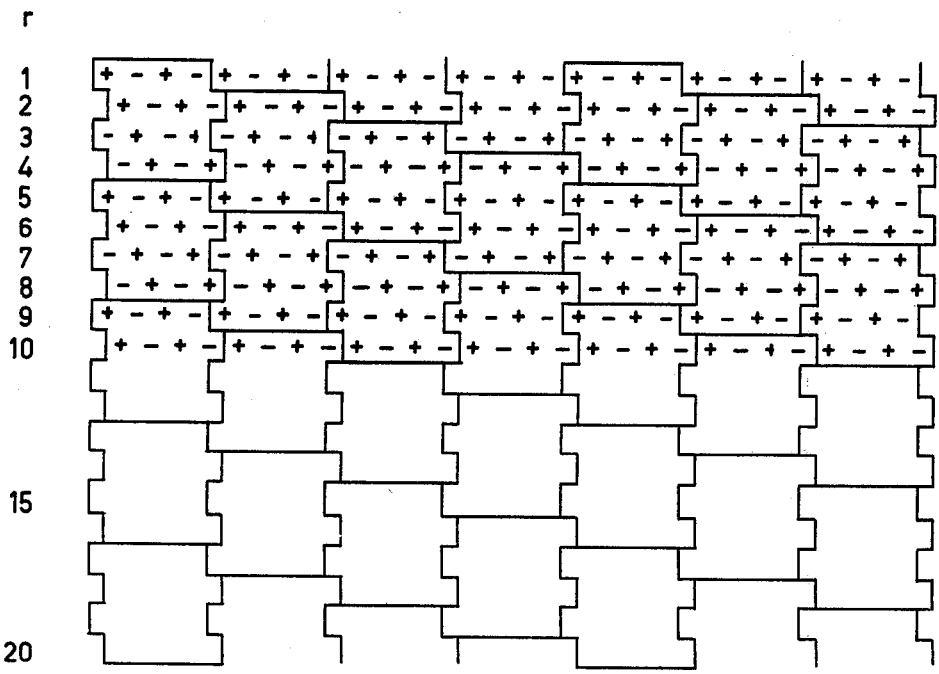

A TV picture can now be divided, in the manner shown in FIG. 10, into subpictures $B_1$ and subpictures $B_2$. To realize this, each line signal must satisfy the requirement that it is characterized by $16j+12$ video signal samples. Herein j represents an integer. From FIG. 3 it can now be derived to what extent $u(t)$ contributes to the different subpictures. This contribution is schematically shown in FIG. 21. When this FIG. 21 is compared with the FIGS. 7 and 19, then it is seen that this contribution is fully described by the basic picture $B_1(6)$ or the basic picture $B_2(7)$.

Figure 22:
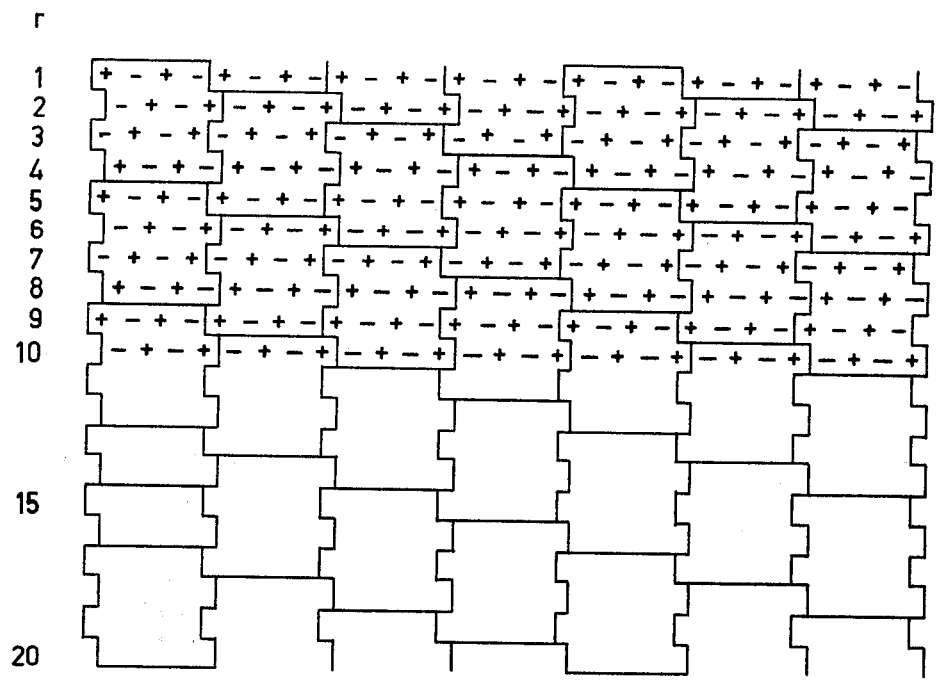

In a corresponding manner, the contribution of $v(t)$ to the several subpictures can be derived from FIG. 4. This contribution is schematically shown in FIG. 22. When this FIG. 22 is compared with the FIGS. 7 and 19, then it is seen that this contribution is fully described by the basic picture $B_1(7)$, or by the basic picture $B_2(6)$. If now $y(6)$ and $y(7)$ must be encoded with the same accuracy, then it is not necessary to know whether a subpicture $B_1$ or a subpicture $B_2$ had been transformed. In this case it is therefore sufficient to accurately encode only the three coefficients $y(0)$, $y(6)$ and $y(7)$.

Figure 23:
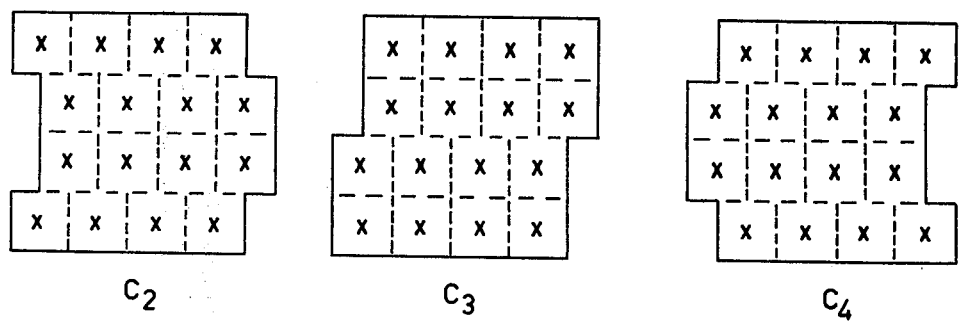
FIGS. 23 and 24 show sampling instants and subpictures to explain the operation of the coding arrangement of FIG. 1 for the case of NTSC and subpictures of a mutually different shape.
Figure 24:
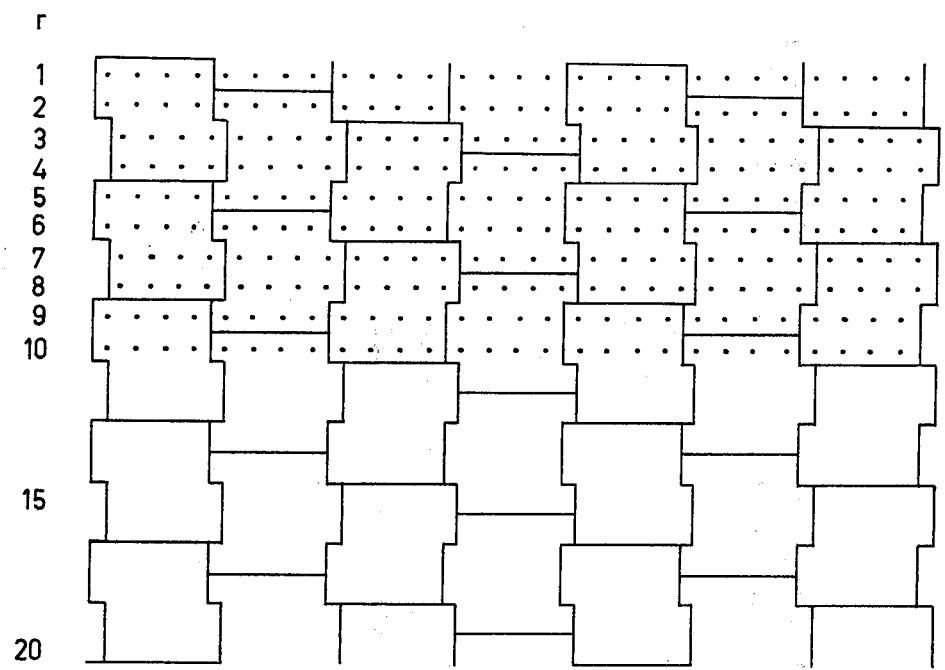

A similar method may be used for NTSC. It is then, namely, possible to take, in addition to the subpicture $C_1$ defined in FIG. 14, one or more of the subpictures $C_2$, $C_3$, $C_4$ which are shown in FIG. 23. A TV picture can now be divided in the manner shown in FIG. 24 into subpictures $C_1$, $C_2$, $C_3$ and $C_4$. A system of sixteen mutually orthogonal basic pictures is also associated with each of these subpictures. The subpictures associated with the subpicture $C_1$ may be denoted by $C_1(i)$, the subpictures associated with $C_2$ by $C_2(i)$, etc. Also, these subpictures may be derived from the basic pictures $C_1(i)$ of FIG. 15. A basic picture $C_m(i)$ is now obtained by so shifting the rows of $C_1(i)$ relative to each other that $C_1(i)$ assumes the shape of the subpicture $C_m$. Herein $m=1, 2, 3, 4$ and $i=0, 1, 2,-15$. Analgous to the foregoing, it can now be derived that the contribution of $u(t)$ to the subpicture $C_m$ is fully described by the basic picture $C_m(5)$. It can also be derived that the contribution of $v(t)$ to the subpictures $C_1$ and $C_3$, respectively, is fully described by the basic pictures $C_1(7)$ and $C_3(7)$, respectively, and that this contribution of $v(t)$ to the subpictures $C_2$ and $C_4$, respectively, is fully described by the basic pictures $C_2(6)$ and $C_4(6)$, respectively. Thus, for NTSC, only the coefficients $\{y(0), y(5), y(7)\}$ and $\{y(0), y(5), y(6)\}$, must be alternately encoded accurately.

DETAILED CONSTRUCTION OF SOME COMPONENTS (1). The transformation arrangement.

Figure 20:
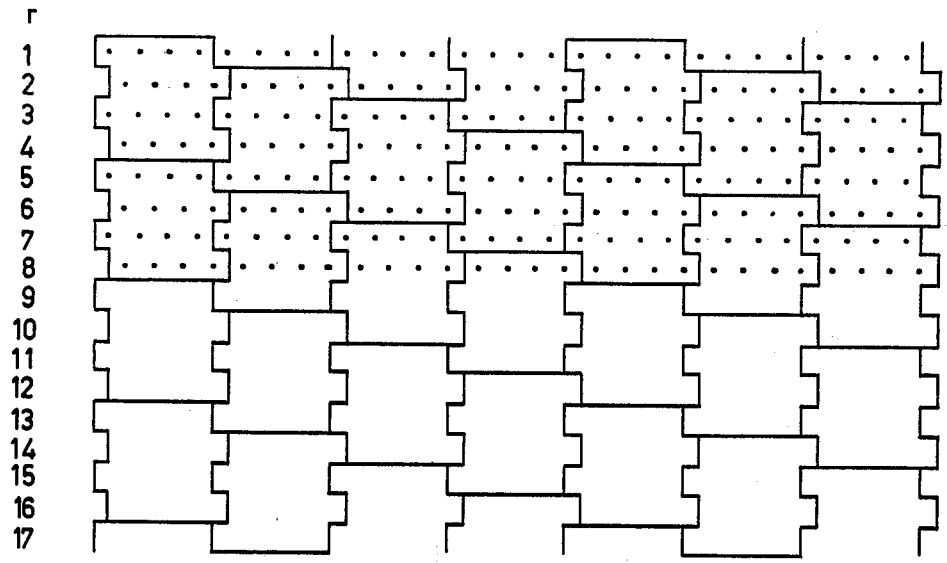
Figure 25:
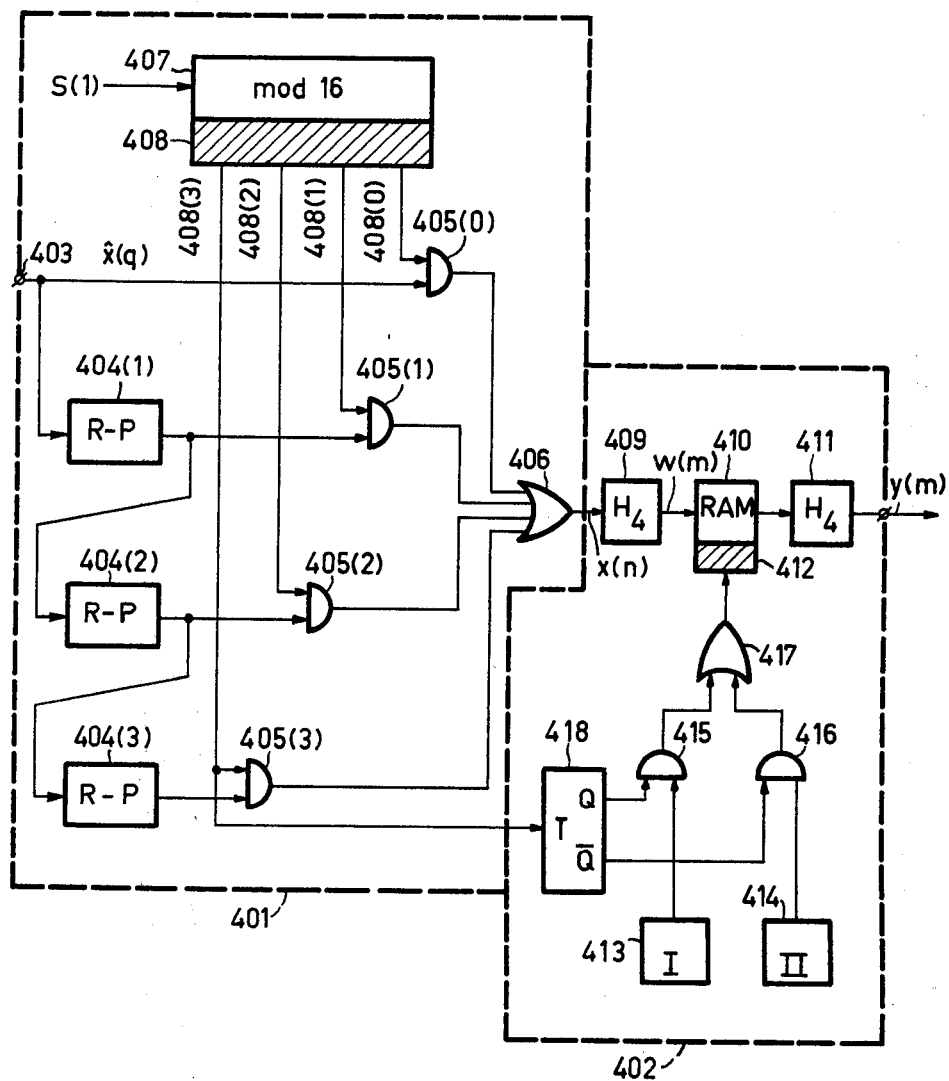
FIG. 25 shows the preferred embodiment of the transform arrangement.

FIG. 25 shows the preferred embodiment of the transform arrangement 4. It is arranged to divide the TV picture into subpictures in the manner shown in FIG. 20 or FIG. 24. Let it be assumed for the case considered here that $P=Q=4$. To this end, this transform arrangement comprises a subpicture-forming circuit 401 and a transformation circuit 402. A cascade arrangement of $Q-1$ delay lines 404(1), 404(2) and 404(3) is connected to the input 403 of the circuit 401. Each delay line has a time delay of $(R-P)/f_s$ seconds and accommodates $R-P$ video signal samples. Herein R represents the number of video signal samples of a line signal and is equal to $R=j.P.Q.+(Q-1)P=16j+12$. The input 403 of this subpicture-forming circuit 401 and the output of each delay line are connected to respective input of an OR-gate circuit 406 via a respective AND-gates $405(i)$. In addition, control pulses are applied to each AND-gate $405(i)$.

More particularly, four control pulses are first applied to AND-gate 405(3), then four pulses to AND-gate 405(2), thereafter four pulses to AND-gate 405(1) and finally four pulses to AND-gate 405(0).

These control pulses are produced by a modulo-16-counter 407, to which the sampling pulses $S(1)$ are applied. Connected to this counter 407 is a decoding network 408 having four outputs $408(i)$, which are connected to respective inputs of AND-gates $405(i)$. This decoding network 408 now produces a logic "1" at its output 408(3) each time the counter has one of the counting positions 1, 2, 3 or 4. A logic "1" occurs at the output 408(2) each time the counter has one of the counting positions 5, 6, 7 or 8. A logic "1" occurs at the output 408(1) each time the counter has one of the counting positions 9, 10, 11, 12, while a logic "1" occurs at the output 408(0) each time the counter has one of the counting positions 13, 14, 15 or 16.

Now the video signal samples $x(n)$ of a subpicture occur sequentially at the output of the OR-gate 406. These video signal samples are applied to the transformation circuit 402, which is formed by a cascade arrangement of a first auxiliary transformer 409, a memory 410 and a second auxiliary transformer 411. These auxiliary transformers 409, 411 are of an identical construction and an embodiment will be described with reference to FIG. 26. It should here be noted that the 4×4 Hadamard matrix of FIG. 8 is assciated with each of these auxiliary transformers.

The memory 410 may be formed by a RAM and is used to store the signal samples w(m) produced by the auxiliary transformer 409. Addressing of this memory 409 is such that the signal samples w(m) stored therein are read in a different sequence than the sequence in which they are entered. To this end, the address code produced by a first or by a second address generator 413 and 414, respectively, is applied to an address decoder 412 of the memory 410. To this end, each of these address generators 413, 414 is connected to the input of the address decoder 412 via AND-gates 415 and 416, respectively, and an OR-gate 417. A control signal is applied to each one of the AND-gates 415 and 416 which is generated by a T-flip-flop 418 to which the output pulses of the decoding network 408 are applied. The signal samples supplied by the memory 410 are applied to the auxiliary transformer 411, which produces the coefficients y(m) serially and at a rate $f_s$.

In this transform arrangement, the subpicture is assumed to be a 4×4 matrix X consisting of sixteen video signal samples. This matrix X is multiplied in the auxiliary transformer 409 by the 4×4 Hadamard matrix $H_4$, which results in the 4×4 matrix W with the elements w(m), in such manner that it holds that:

$$W = XH_4$$

In order to obtain, again using $H_4$, the desired coefficients y(m), the matrix W must first be transposed. This is realized by the use of the memory 410 and the two address generators 413 and 414 under the control of which W is entered row by row into the memory 410 and read again column by column. By now multiplying the transposed matrix $W^T$ by $H_4$, a 4×4 matrix Y is obtained such that:

$$Y = W^T H_4$$

the elements of which are the desired coefficients.

Figure 26:
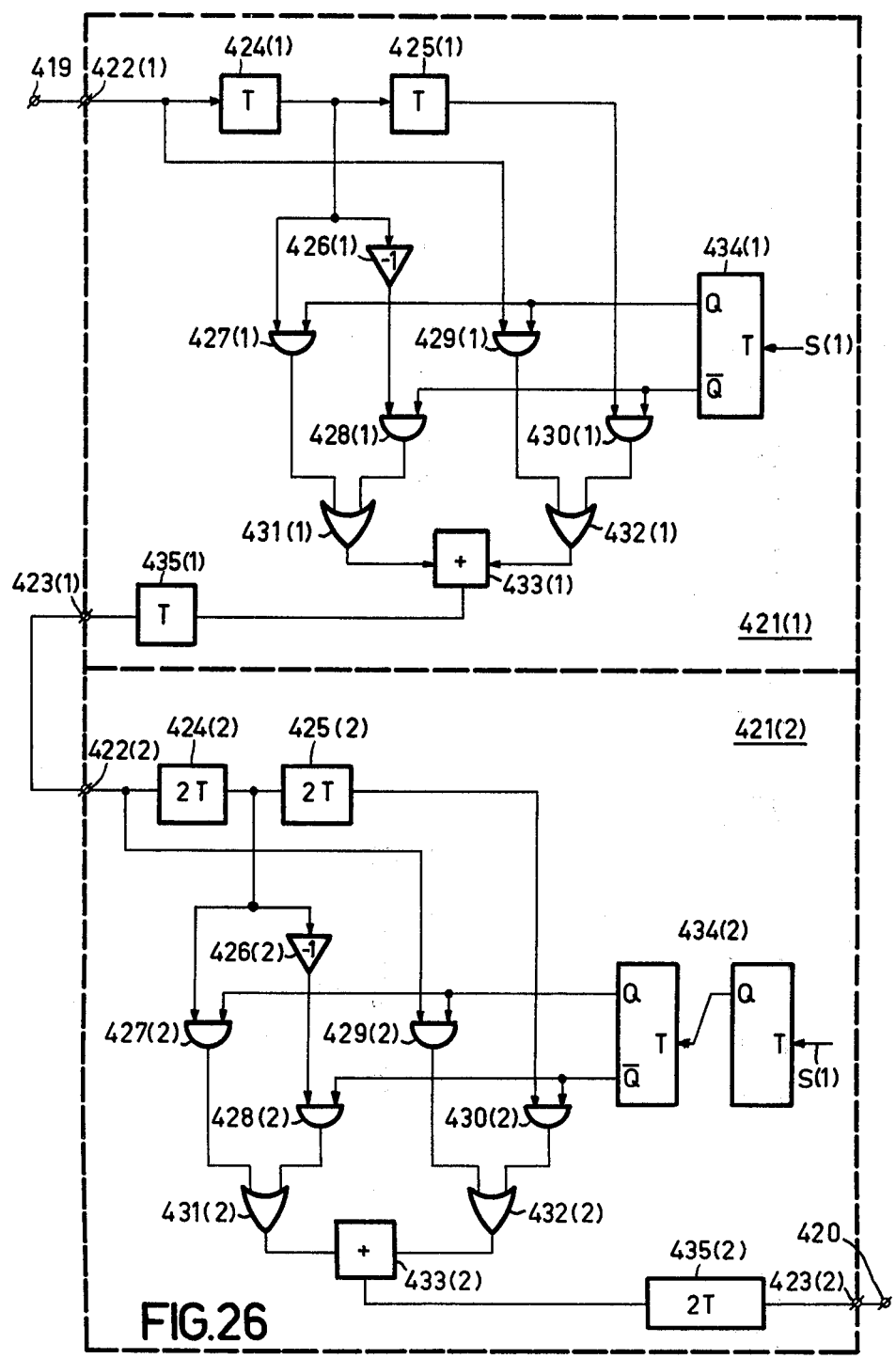
FIG. 26 shows the preferred embodiment of the auxiliary transformer for use in the transform arrangement shown in FIG. 25.

FIG. 26 shows an embodiment of the auxiliary transformer. The above-mentioned Hadamard matrix $H_4$ is associated with this auxiliary transformer. It has an input 419 and an output 420, between which a cascade arrangement of a number of auxiliary circuits 421(i) has been arranged. Each of these auxiliary circuits has an input 422(i) and an output 423(i). A cascade arrangement of two delay elements 424(i) and 425(i) is connected to the input 422(i). Inputs and outputs of these delay elements 424(i) and 425(i) are connected, in the manner shown in the Figure, to inputs of an adder arrangement 433(i) by means of an invertor circuit 426(i), AND-gate circuits 427(i), 428(i), 429(i) and 430(i) and OR-gates 431(i) and 432(i). Control pulses, which are derived from the sampling pulses S(1) by means of a dividing circuit 434(i) are applied to the AND-gates 427(i), 428(i), 429(i) and 430(i). The output of the adder arrangement 433(i) is connected to the output 423(i) of the auxiliary circuit 421(i) through a delay circuit 435(i).

In the embodiment shown, in which the Hadamard transformation matrix $H_4$ must be realized, the auxiliary transformer arrangement comprises two auxiliary circuits 421(1) and 421(2) and the time delay of the delay elements 424(1), 425(1), 435(1) is equal to $T = 1/f_s$ and the time delay of the elements 424(2), 425(2) and 435(2) equal to 2T. The divider circuit 434(1) has a division factor of two and is formed by one T-flip-flop. Divider circuit 434(2) has a division of four and is formed by a cascade arrangement of two T-flip-flops.

Should a Hadamard transformation matrix $H_8$ be realized, then it is sufficient to connect a third auxiliary circuit 421(3) to the output 423(2), the time delay of the delay elements 424(3), 425(3) and 435(3) being equal to 4T. The divider circuit 434(3) must then have a division factor of eight and may be formed by a cascade arrangement of three T-flip-flops.

(2). The variable word length auxiliary coding arrangement

Figure 27:
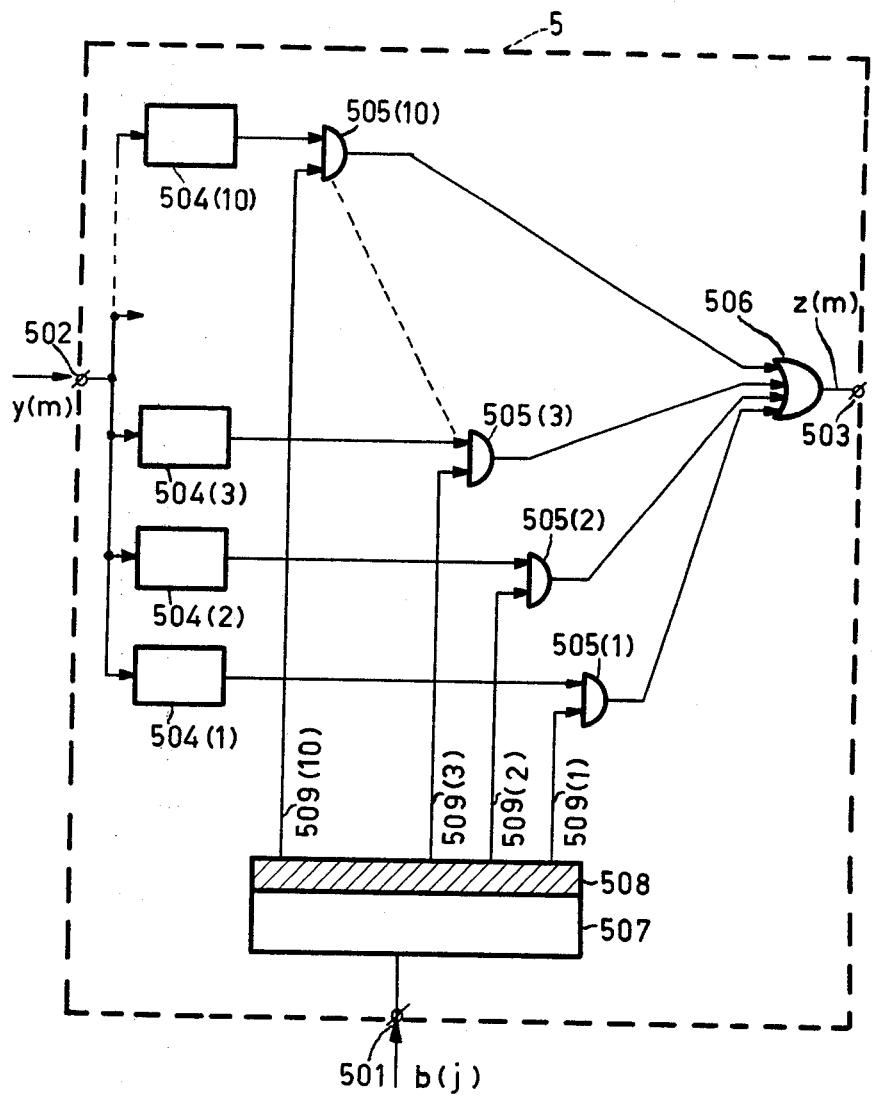
FIG. 27 shows an embodiment of a variable word length auxiliary coding arrangement.

FIG. 27 shows an embodiment of the variable word length auxiliary coding arrangement 5. This coding arrangement 5 has the above-mentioned input 501 to which quantities b(j) are applied, which will be called bit-assignment elements hereinafter. In addition, it has an input 502 to which the coefficients y(m) are applied and an output 503 at which the code words z(m) occur. A number of auxiliary encoders, ten in this case, 504(1), 504(2)–504(10), which in this case produce for example 1, 2, 3,—and 10-bit code words, respectively, are connected to the input 502. Via AND-gates 505(.) and an OR-gate 506, the outputs of these auxiliary encoders 504(i) are connected to the output 503. In addition, this coding arrangement 5 comprises a memory 507 in which the bit-assignment elements b(j) are temporarily stored. A decoding network 508, having ten outputs 509(i), is connected to this memory 507. Each of these outputs 509(i) is connected to an input of an AND-gate 504(i). If now an element b(j) is written into the memory 507, a pulse is supplied from a predetermined output 509(i) of the decoding network 508. This pulse is applied to the AND-gate 505(i), which is connected to this output, in response to which the code word produced by the auxiliary coding arrangement 504(i) is applied to an output code word z(m) to the output 503.

It should be noted that in many cases the bit-assignment element b(j) will represnt the number i of the auxiliary coding arrangement 504(i) the output code word of which must be applied to the output 503 as the code word z(m). Only in the above-described embodiment i is also equal to the number of bits in z(m).

It should also be noted that the relationship between z(m) and y(m) may be a linear relationship; a non-linear relationship is, however, alternatively possible.

As in the embodiment described here, the coefficients y(m) are already available in digital form, the auxiliary encoders 504(i) are each preferably formed as a memory, for example a ROM, which is addressed by the coefficient y(m).

Figure 28:
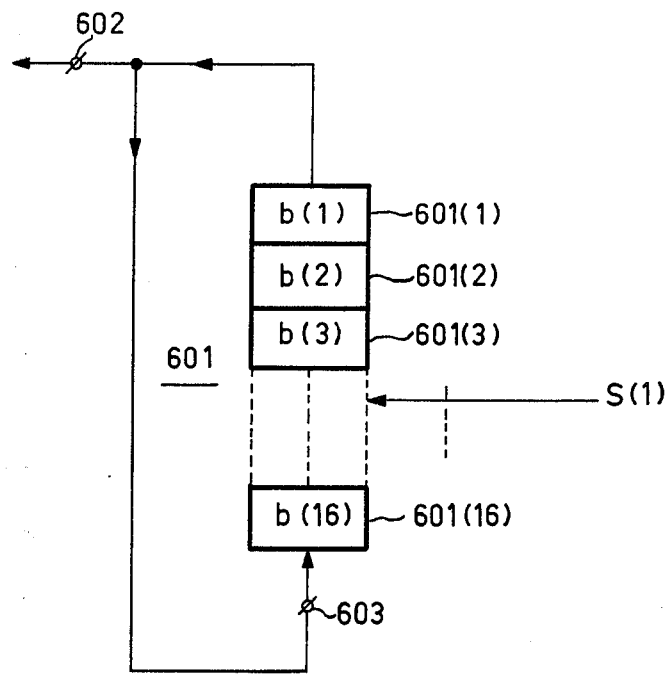
FIG. 28 shows an embodiment of a bit-assignment memory 6 for use in the coding arrangement of FIG. 1.

In order to have the bit-assignment element b(j) occur sequentially, as is assumed here, the bit-assignment memory 6 is preferably in the form of a circulating shift register. FIG. 28 shows a schematic embodiment thereof. It comprises a shift register 601 having a total of 16 shift register elements 601(j), each arranged to store a bit-assignment element b(j). The content of this register 601 is shifted by the pulses S(1). The output 602 of this shift register 601 is connected to the input 501 of the variable word length auxiliary coding arrangement 5. To obtain the circulating character, the output 602 is also connected to the shift register input 603.

Figure 29:
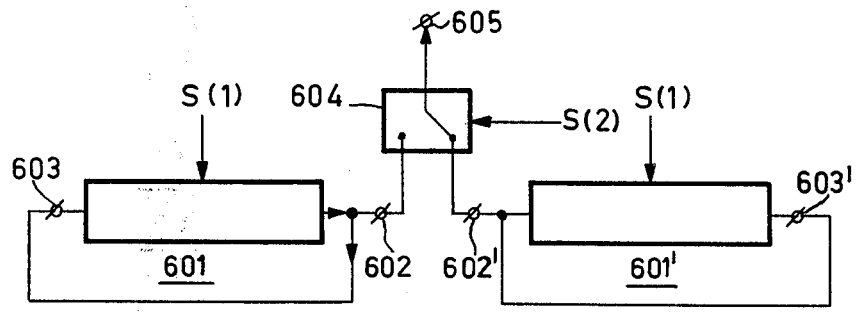
FIG. 29 shows a bit-assignment memory for use in a coding arrangement which is suitable for processing NTSC color video signals.

As described in paragraph F(4), the system of coefficients {y(0), y(5), y(7)} and {y(0), y(5), y(6)} must alternately be encoded accurately for the case of NTSC. This can be effected in a simple way by implementing the bit-assignment memory 6 by means of two circulating shift registers. This is schematically shown in FIG. 29. The bit-assignment memory shown there comprises the two circulating shift registers 601 and 601', each being of the type shown in FIG. 28. Each of these circulating shift registers has its input 602 and 602', respectively, connected to an input of a switching device 604, which is only shown symbolically in the Figures and which is controlled by control pulses S(2). The output 605 of this switching device 604 is connected to the input 501 of the variable word length auxiliary coding arrangement 5. In the register 601 there are now inter alia stored those bit-assignment elements b(j) which assign comparatively many bits to each of the coefficients y(0), y(5), and y(7), while in the register 601' there are inter alia stored those bit-assignment elements which assign comparatively many bits to the coefficients y(0), y(5), y(6).

(3). The control circuit.

This paragraph contains a detailed description of the manner in which the required control signals are generated to control the above-described arrangements.

Figure 30:
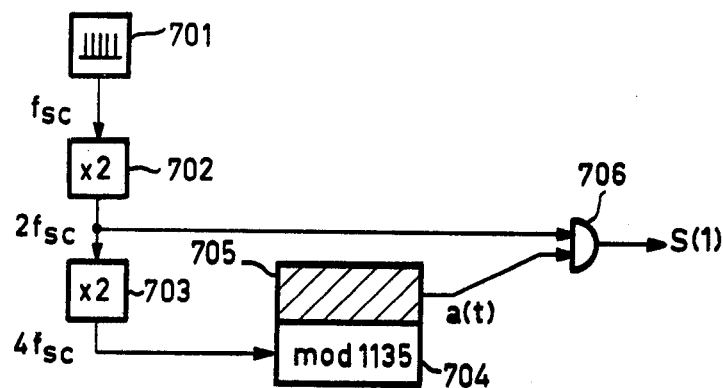
FIG. 30 shows a control circuit for use in combination with a coding arrangement which is suitable for processing PAL color video signals.

For the PAL system, the control circuit shown in FIG. 30 can be used. Let it be assumed that i=284, so that $4f_{sc}=1135\ f_1$ and that a total of 556 samples are needed from each line signal which has a duration of 64 microseconds. This control circuit comprises a clock pulse oscillator 701, which produces output pulses at a rate of $f_{sc}$ and which is kept in a known and customary manner (for example by means of a phase-locked loop) in synchronism with the color auxiliary carrier which has the color subcarrier frequency $f_{sc}$. The output pulses of this oscillator 701 are applied to a cascade arrangement of two frequency multipliers 702 and 703 which each have a multiplying factor of two. The clock pulses produced by the multipliers 703 and occurring at a rate of $4f_{sc}$, are applied to a modulo-1135 counter 704. A decoding network 705, which produces a signal a(t), is connected to this counter 704. This signal a(t) has the logic value "0" as long as counter 704 has one of the counting positions 1 through 23 and a(t) has the logic value "1" as long as this counter 704 has one of the counting positions 24 through 1135. Together with the pulses which are produced by the frequency multiplier 702 and which occur at a rate $2f_{sc}$, this signal a(t) is applied to an AND-gate 706 at the output of which the sampling pulses S(1) occur. More particularly, the pulses produced by the multiplier 702 are passed by AND-gate 706 when a(t) has the logic value "1". If, however, a(t) has the logic value "0" then these pulses are not passed by the AND-gate 706.

Figure 31:
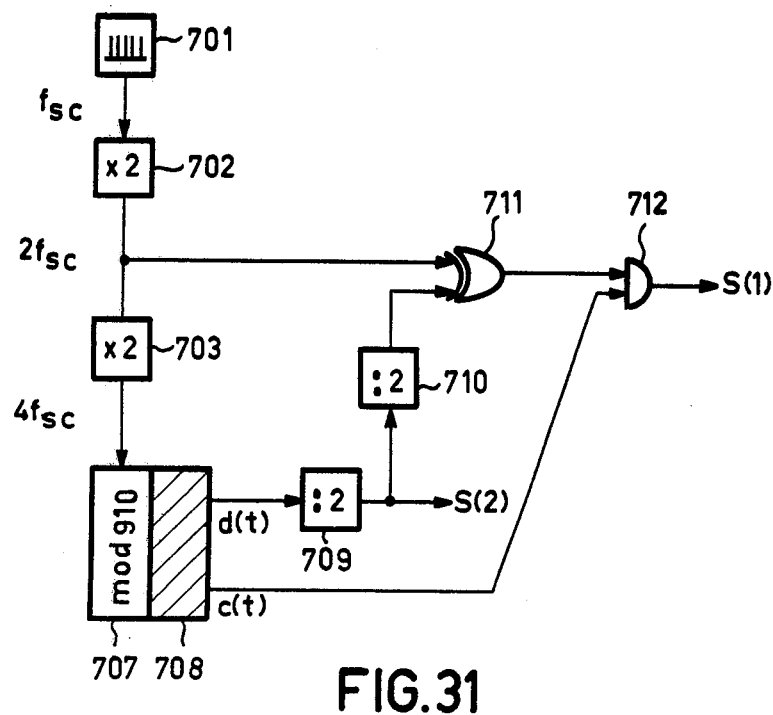
FIG. 31 shows a control circuit for use in combination with a coding arrangement which is suitable for processing NTSC color video signals.

The control circuit shown in FIG. 31 may be used for the NTSC system. Let it be assumed that i=228, so that $4f_{sc}=910\ f_1$ and that a total of 444 samples is needed from each line signal. This control circuit also comprises a clock pulse oscillator 701, which produces output pulses at a rate of $f_{sc}$ and which is kept in a known and customary manner in synchronism with the color auxiliary carrier. The output pulses of this clock pulse oscillator 701 are applied to a cascade arrangement of two frequency multipliers 702 and 703, each having a multiplying factor of two. The clock pulses produced by the multiplier 703 and occurring at the rate $4f_{sc}$, are applied to a modulo-910-counter 707. A decoding network 708, which produces a signal c(t), and a signal d(t) is connected to this counter 707. The signal c(t) has the logic value "0" as long as counter 707 has one of the counting positions 1 through 22 and c(t) has the logic value "1" as long as this counter 707 has one of the counting positions 23 through 910. The signal d(t) has the logic value "1" when, and only then, the counter has the counting position 910. This signal d(t), in which the pulses therefore occur at a rate $f_1$, is now applied via two frequency dividers 709 and 710 to an exclusive-OR-gate 711, to which also the output pulses from the multiplier 702 are applied. Each of the frequency dividers 709 and 710 has a division factor of 2, so that pulses occur at the output of the frequency divider 709 at a rate of $\frac{1}{2}f_1$. The last-mentioned pulses form the control pulses S(2) which are applied to the switching device 604 of the bit-assignment memory 6 of FIG. 29. Together with the signal c(1), the output pulses of the exclusive-OR-gate 711 are applied to an AND-gate 712 which produces the sampling pulses S(1).

(4). An alternative transform arrangement

Figure 32:
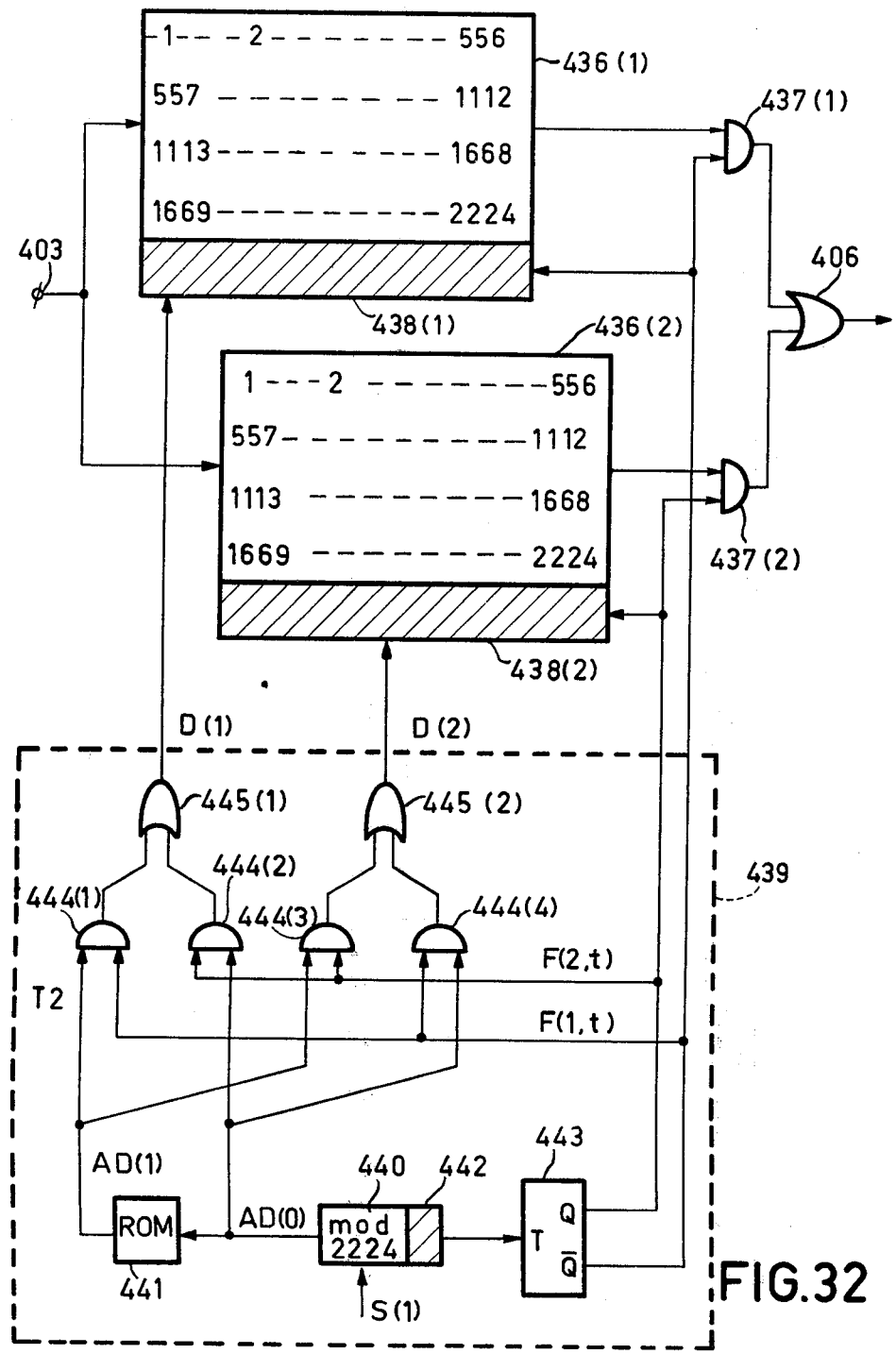
FIG. 32 shows an alternative embodiment of the subpicture-forming circuit for use in the transform arrangement.

FIG. 25 shows an embodiment of a transform arrangement, the subpicture-forming circuit 401 of which has a number of delay lines (three in this instance). This circuit 401 is particularly suitable to divide the TV picture in the manner shown in FIG. 20 or in FIG. 24 into subpictures of mutually different shapes. If, however, the TV picture is to be divided into subpictures in the manner shown in FIG. 2 or in FIG. 11, these subpictures all having the same shape, then this subpicture-forming circuit 401 may be implemented in the manner shown in FIG. 32. This circuit comprises two memories 436(1) and 436(2), which are each in the form of a RAM (random access memory) and which are used alternately. In such a memory 436(i) the video signal samples of four consecutive line signals are entered sequentially. In the embodiment shown, it is assumed that each line signal consists of 556 video signal samples. The 556 signal samples of the first line signal of the four consecutive line signals are stored in those memory locations which have the numbers 1, 2, 3,–556, respectively. The 556 signal samples of the second line signal are stored in the storage locations having the numbers 557, 558,–1112, respectively. The video signal samples of the third and the fourth line signal are stored correspondingly. The video signal samples thus stored are read in blocks of 4×4 signal samples, that is to say that at the output of this memory, there appears one after the other, the video signal samples which were stored in the storage locations which have the numbers 1, 2, 3, 4, 557, 558, 559, 560, 1113, 1114, 1115, 1116, 1669, 1670, 1671, 1672, respectively. Thereafter there appears at the output one after the other the video signal samples which were stored in the storage locations having the numbers 5, 6, 7, 8, 561, 562, 563, 564, 1117, 1118, 1119, 1120, 1673, 1674, 1675, 1676. A third and fourth block are thereafter read in a corresponding manner. Through an AND-gate 437(i) the video signal samples appearing at the output of the memory 436(i) are applied to the OR-gate 406, the output of which is connected to the input of the transformation circuit 402 (cf. FIG. 25).

In order for the memories 436(i) to function in the above-described manner, each of these memories 436(i) includes an address decoder 438(i) which each receive address codes D(i) as well as a read-write signal F(i,t). It holds that F(2,t) is the logic inverted version of F(1,t) and that, if F(i,t) has the logic value "0" this signal then functions as a write signal, so that it is possible to write video signal samples into the relevant memory. If F(i,t) has the logic value "1", then it functions as a read signal, causing the content of the relevant memory to be applied to its output. As shown in the Figure, these write-read signals are also applied to the AND-gates 437(i).

These address codes and these read-write signals are generated by a control circuit 439. This control circuit comprises a modulo-2224 counter 440 to which the sampling pulses S(1) are applied and the counting positions of which are used as address codes AD(0). These address codes AD(0) are applied to a ROM 441, which furnishes the address codes AD(1). The relationship between AD(0) and AD(1) is partly shown in FIG. 33. Further, a decoding network 442, which produces a pulse at its output each time this counter, assumes the counting position one, is connected to this counter 440.

This pulse is applied to a divide-by-two divider 443 (for example a T-flip-flop) which produces the read-write signal F(2,t) at its output Q and the signal F(1,t) at its output Q. These signals F(1,t) and F(2,t) as well as the address codes AD(0) and AD(1) are applied in the manner shown in the Figure to AND-gates 444(i), the outputs of which are connected to inputs of OR-gates 445(1) and 445(2), which produce the address codes D(1) and D(2), respectively. More in particular, it holds that, when F(1,t) has the logic value "0" that then D(1)=AD(0) and D(2)=AD(1). If, on the contrary, F(1,t) has the logic value "1", then it holds that D(1)=AD(1) and D(2)=AD(0).

Final remarks

I. FIG. 25 shows schematically how the transformation circuit is preferably implemented by means of two auxiliary transformers, the 4×4 Hadamard matrix of FIG. 8 being associated with each auxiliary transformer. Alternatively, this transformation circuit may be implemented in the manner described in Reference 5. The video signal samples x(n) of a subpicture, which are sequentially produced by the subpicture-forming circuit 401, are then considered, in accordance with expression (1), to be the elements of a column vector X'. In a corresponding manner, the coefficients y(m), produced by the transformation circuit 402, are considered to be the elements of a column vector Y' and the relationship between the vectors X' and Y' are given by, for example, the 16×16 Hadamard matrix $H_{16}$ in FIG. 34, so that it holds that:

$$T = H_{16} X'$$

II. In the embodiments of the encoding arrangement which were tested in actual practice, N was chosen equal to 16. The number of bits into which the coefficients y(m) were encoded is shown in the Table of FIG. 35. More particularly, in this Figure, column m shows the number of the coefficient y(m) and the column {y(m)} shows the number of bits into which the relevant coefficient y(m) was encoded in a PAL system, the TV picture having been divided into subpictures in the manner shown in FIG. 20.

III. In the foregoing it was assumed that each coefficient is continuously encoded with the same number of bits. Such a coding method is called "non-adaptive". Here it should be noted that also a so-called "adaptive coding method" may be used, for example one of the methods described in Reference 4, but preferably the method described in co-pending U.S. patent application Ser. No. 278,235, filed June 29, 1981.

What is claimed is:

1. A method of digitizing a color video signal which is formed by a sequence of line signals each comprising a superposition of a brightness signal and two color information signals u(t) and v(t) which are each formed by a color difference signal modulated on subcarrier with a color subcarrier frequency $f_{sc}$, the method comprising the following steps:
   (a) sampling the color video signal with a sampling frequency $f_s$ which is equal to twice the color subcarrier frequency $f_{sc}$ and at instants which coincide with the phase points $\pm \pi/4 + M\pi$ of the color information signal u(t) in the line signal, M representing an integer, to generate video signal samples x(n);
   (b) forming a subpicture comprising Q video groups which are each formed by a sequence of P video signal samples of the relevant line signal and are associated with Q consecutive line signals;
   (c) converting such a subpicture into a group of coefficients consisting of N coefficients y(m) which are each equal to the sum of versions of the subpicture video signal samples which have been weighted with a factor +1 or −1, wherein m=0, 1, 2, −N−1 and wherein N is equal to the product of P and Q; and
   (d) converting each of the coefficients y(m) into a code word z(m) which comprises a number of bits assigned to the relevant coefficient.

2. An arrangement for digitizing a color video signal which is formed by a sequence of line signals each comprising a superposition of a brightness signal and two color information signals u(t) and v(t) which are each formed by a color difference signal modulated on a subcarrier with a color subcarrier frequency $f_{sc}$, comprising:
   (a) means for sampling the color video signal with a sampling frequency $f_s$ which is equal to twice the color subcarrier frequency $f_{sc}$ and at instants which coincide with the phase points $\pm \pi/4 + M\pi$ of the color information signal u(t) in the line signal, M representing an integer, to generate video signal samples x(n);
   (b) means for forming a subpicture comprising Q video groups which are each formed by a sequence of P video signal samples of the relevant line signal and are associated with Q consecutive line signals;
   (c) means for converting such a subpicture into a group of coefficients consisting of N coefficients y(m) which are each equal to the sum of versions of the subpicture video signal samples which have been weighted with a factor +1 or −1, wherein m=0, 1, 2, -N−1 and wherein N is equal to the product of P and Q; and
   (d) means for converting each of the coefficients y(m) into a code word z(m) which comprises a number of bits assigned to the relevant coefficient.

* * * * *